United States Patent [19]

Hartung et al.

[11] Patent Number: 5,334,420
[45] Date of Patent: Aug. 2, 1994

[54] PROCESS FOR THE PRODUCTION OF A MULTICOAT FINISH, AND AN AQUEOUS PAINT

[75] Inventors: Michael Hartung, Geseke; Michael Grabbe, Senden; Peter Mayenfels, Münster, all of Fed. Rep. of Germany

[73] Assignee: BASF Lacke & Farben Aktiengesellschaft, Munster, Fed. Rep. of Germany

[21] Appl. No.: 927,510

[22] PCT Filed: Mar. 13, 1991

[86] PCT No.: PCT/EP91/00464
§ 371 Date: Sep. 16, 1992
§ 102(e) Date: Sep. 16, 1992

[87] PCT Pub. No.: WO91/15528
PCT Pub. Date: Oct. 17, 1991

[30] Foreign Application Priority Data

Mar. 30, 1990 [DE] Fed. Rep. of Germany ....... 4010176

[51] Int. Cl.⁵ ............... B05D 1/36; B05D 7/16; B05D 7/26
[52] U.S. Cl. ............... 427/407.1; 427/409; 427/412; 427/412.1; 524/521; 525/63
[58] Field of Search ............ 523/415; 427/407.1, 427/409, 412, 412.1; 524/521; 525/63

[56] References Cited

U.S. PATENT DOCUMENTS 4,036,800  7/1977  Sekmakas et al. ............ 523/415
5,095,069  3/1992  Ambrose et al. .............. 528/64

Primary Examiner—Melvyn L. Marquis
Assistant Examiner—D. Aylward
Attorney, Agent, or Firm—Anne Gerry Sabourin

[57] ABSTRACT

The invention relates to a process for the production of a multicoat finish, in which an aqueous basecoat is used which contains as binder a polymer which can be obtained by polymerizing in an organic solvent (A) ethylenically unsaturated monomers in the presence of (B) a polyurethane resin containing polymerizable double bonds and converting the resultant reaction product to an aqueous dispersion.

16 Claims, No Drawings

PROCESS FOR THE PRODUCTION OF A MULTICOAT FINISH, AND AN AQUEOUS PAINT

The invention relates to a process in which
(1) a pigmented aqueous basecoat is applied to the substrate surface,
(2) a polymer film is formed from the composition applied in stage (1),
(3) a transparent topcoat is applied to the basecoat obtained in this way and subsequently
(4) the basecoat is baked together with the topcoat.

The invention also relates to an aqueous paint.

The process for the production of multicoat finishes described above is known and is employed especially for the finishing of automobile bodies.

The result of the process described above crucially depends on the basecoat used. The basecoat has a strong influence on the quality of the overall finish.

No aqueous basecoats have been known up to now which are suitable for production line finishing and for refinishing and which furnish high-quality overall finishes.

The object of the present invention consists in providing novel aqueous paints which are suitable as basecoats for performing the process described above.

This object is achieved by making available aqueous paints which comprise as binder a polymer which can be obtained by polymerizing in an organic solvent or in a mixture of organic solvents (A) ethylenically unsaturated monomers or a mixture of ethylenically unsaturated monomers in the presence of (B) a polyurethane resin which has a number average molecular weight of 200 to 30,000, preferably of 1,000 to 5,000 and contains on statistical average 0.05 to 1.1, preferably 0.2 to 0.9, particularly preferably 0.3 to 0.7 polymerizable double bonds per molecule and converting the reaction product obtained in this way to an aqueous dispersion.

The basecoats according to the invention are distinguished by the fact that they may be recoated after a short time with an aqueous or conventional clearcoat by the "wet-on-wet" process without disturbing the basecoat film, and that they furnish—even at low baking temperatures, for example at 80° C.—finishes with high moisture resistance and good mechanical properties.

EP-A-297,576 discloses basecoats which are suitable for performing the process under discussion. The basecoats described in EP-A-297,576 comprise as binders polymers which can be obtained by polymerizing in water ethylenically unsaturated compounds in the presence of a polyurethane resin which is free from double bonds. This process is costly and gives rise to binder dispersions which often contain a coagulate and are unsuitable for pigment dispersion. In addition, the binders disclosed in EP-A-297,576 differ significantly in their chemical structure from the binders used according to the invention.

For the preparation of the binders used according to the invention a polyurethane resin (B) is prepared in a first step according to well-known methods of polyurethane chemistry. The polyurethane resin is prepared from the following components:

(a) a polyester polyol and/or a polyether polyol having a number average molecular weight of 400 to 5,000, or a mixture of such polyester polyols and/or polyether polyols, (b) a polyisocyanate or a mixture of polyisocyanates, (c) if appropriate, a compound which contains in addition to a polymerizable double bond at least one group reactive toward NCO groups, or a mixture of such compounds, (d) if appropriate, a compound which contains in the molecule at least one group which is reactive toward isocyanate groups and at least one group which is capable of forming anions, or a mixture of such compounds, (e) if appropriate, a compound which contains in the molecule at least one group which is reactive toward NCO groups and at least one poly(oxyalkylene) group, or a mixture of such compounds and, if appropriate, (f) an organic compound containing hydroxyl and/or amino groups having a molecular weight of 60 to 600, or a mixture of such compounds.

The polyurethane resin (B) should have a number average molecular weight of 200 to 30,000, preferably 1,000 to 5,000, and on statistical average 0.05 to 1.1, preferably 0.2 to 0.9, particularly preferably 0.3 to 0.7 polymerizable double bonds per molecule. It is preferred that the polyurethane resin (B) has an acid value of 0 to 2.0. As is known to a person skilled in the art, the molecular weight of the polyurethane resins can be controlled in particular by the quantity ratio and the functionality of the starting compounds (a) to (f) used.

The polyurethane resins may be prepared both in bulk and in organic solvents.

The polyurethane resins may be prepared by simultaneous reaction of all starting compounds. However, in many cases it is expedient to prepare the polyurethane resins in stages. Thus, for example, it is possible to prepare a prepolymer containing isocyanate groups from the components (a) and (b) which is then reacted further with the component (c). It is further possible to prepare from the components (a), (b), (c) and, if appropriate, (d) and (e) a prepolymer containing isocyanate groups which can subsequently be reacted with the component (f) to form high-molecular polyurethanes. In those cases in which a compound is used as the component (c) which only contains a single group reactive toward isocyanate groups, it is possible to prepare in a first stage from (b) and (c) an intermediate containing isocyanate groups which can be subsequently further reacted with the other components.

The reaction of the components (a) to (f) is expediently carried out in the presence of catalysts such as, for example, dibutyltin dilaurate, dibutyltin maleate, tertiary amines etc.

The amounts of the component (a), (b), (c), (d), (e) and (f) to be used are determined by the targeted number average molecular weight and the targeted acid value. The polymerizable double bonds can be introduced into the polyurethane molecules by using components (a) containing polymerizable double bonds and/or the component (c). It is preferred to introduce the polymerizable double bonds via component (c).

Saturated and unsaturated polyester polyols and/or polyether polyols, in particular polyester diols and/or polyether diols, having a number average molecular weight of 400 to 5,000 may be used as the component (a). Examples of suitable polyether diols are polyether diols of the general formula $H(-O-(CHR^1)_n-)_mOH$, in which $R^1$ is hydrogen or a lower, unsubstituted or substituted alkyl radical, n is 2 to 6, preferably 3 to 4 and m is 2 to 100, preferably 5 to 50. Examples are linear or branched polyether diols such as poly(oxyethylene) glycols, poly(oxypropylene) glycols and poly(oxybutylene) glycols. The chosen polyether diols should not introduce excessive amounts of ether groups, since otherwise the polymers formed swell in water. The preferred polyether diols are poly(oxypropylene) glycols in the molecular mass range $M_n$ of 400 to 3,000.

Polyester diols are prepared by esterification of organic dicarboxylic acids or their anhydrides with organic diols or they are derived from a hydroxycarboxylic acid or a lactone. To prepare branched polyester polyols it is possible to a small extent to use polyols or polycarboxylic acid of higher valency. The dicarboxylic acids and diols may be linear or branched aliphatic, cycloaliphatic or aromatic dicarboxylic acids or diols.

The diols used for the preparation of the polyesters consist, for example, of alkylene glycols such as ethylene glycol, propylene glycol, butylene glycol, 1,4-butanediol, 1,6-hexanediol, neopentyl glycol and other diols such as dimethylolcyclohexane. However, small amounts of polyols, such as trimethylolpropane, glycerol and pentaerythritol, may also be added. The acid component of the polyester consists primarily of low-molecular dicarboxylic acids or their anhydrides having 2 to 44, preferably 4 to 36 carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutark acid, hexachloroheptanedicarboxylic acid, tetrachlorophthalic acid and/or dimerized fatty acids. Instead of these acids it is also possible to use their anhydrides, where they exist. In the synthesis of polyester polyols smaller amounts of carboxylic acids with 3 or more carboxyl groups, for example trimellitic anhydride or the adduct of maleic anhydride and unsaturated fatty acids [sic], may also be present.

It is also possible to use polyester diols which are obtained by reacting a lactone with a diol. They are distinguished by the presence of terminal hydroxyl groups and recurrent polyester moieties of the formula $(-CO-(CHR^2)_n-CH_2-O)$. In this formula n is preferably 4 to 6 and of the substituent $R^2$ is hydrogen, an alkyl, cycloalkyl or alkoxy radical. No substituent contains more than 12 carbon atoms. The total number of carbon atoms in the substituent does not exceed 12 per lactone ring. Corresponding examples are hydroxycaproic acid, hydroxybutyric acid, hydroxydecanoic acid and/or hydroxystearic acid.

The unsubstituted $\epsilon$-caprolactone in which n has the value of 4 and each of the $R^2$ substituents is hydrogen, is preferred for the preparation of the polyester diols. The reaction with the lactone is initiated by low-molecular polyols such as ethylene glycol, 1,3-propanediol, 1,4-butanediol and dimethylolcyclohexane. However, other reaction components, such as ethylenediamine, alkyldialkanolamines or even urea may also be reacted with caprolactone. Suitable high-molecular diols are also polylactam diols which are prepared by reaction of, for example, $\epsilon$-caprolactam with low-molecular diols.

If polymerizable double bonds are to be introduced into the polyurethane molecules via the component (a), then the components (a) used must contain polymerizable double bonds. Examples of such components (a) are polyester polyols, preferably polyester diols, which have been prepared by using polyols and/or polycarboxylic acids containing polymerizable double bonds. Examples of polyols containing polymerizable double bonds are: trimethylolpropane monoallyl ether, glycerol monoallyl ether, pentaerythritol monoallyl ether and pentaerythritol diallyl ether. Examples of carboxylic acids containing polymerizable double bonds are alkenedicarboxylic acids, maleic acid and unsaturated dimerized fatty acids.

Aliphatic and/or cycloaliphatic and/or aromatic polyisocyanates may be used as the component (b). Examples of aromatic polyisocyanates are phenylene diisocyanate, tolylene diisocyanate, xylylene diisocyanate, biphenylene diisocyanate, naphthylene diisocyanate and diphenylmethane diisocyanate.

On account of their good resistance to ultraviolet light (cyclo) aliphatic polyisocyanates furnish products having low tendency to yellowing. Examples of cycloaliphatic polyisocyanates are isophorone diisocyanate, cyclopentylene diisocyanate and the hydrogenation products of aromatic diisocyanates such as cyclohexylene diisocyanate, methylcyclohexylene diisocyanate and dicyclohexylmethane diisocyanate. Aliphatic diisocyanates are compounds of the formula $$OCN-(CR^3{}_2)_r-NCO \text{ [sic]},$$

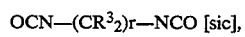

in which r is an integer from 2 to 20, in particular from 6 to 8, and $R^3$ which can be the same or different, is hydrogen or a low alkyl radical having 1 to 8 carbon atoms, preferably 1 or 2 carbon atoms. Corresponding examples are trimethylene diisocyanate, tetramethylene diisocyanate, pentamethylene diisocyanate, hexamethylene diisocyanate, propylene diisocyanate, ethylethylene diisocyanate, dimethylethyl diisocyanate, methyl trimethylene diisocyanate and trimethylhexane diisocyanate. A further example of an aliphatic diisocyanate is tetramethylxylene diisocyanate. Isophorone diisocyanate and dicyclohexylmethane diisocyanate are particularly preferred as the diisocyanates.

The composition of the component (b) must in respect of functionality of the polyisocyanates be such that it contains no crosslinked polyurethane resin. In addition to diisocyanates, the component (b) may also contain a proportion of polyisocyanates having functionalities greater than two, for example triisocyanates.

Products which are formed by trimerization or oligomerization of diisocyanates or by reaction of diisocyanates with compounds containing polyfunctional OH or NH groups, have been found satisfactory as the triisocyanates. This group of compounds includes, for example, the biuret of hexamethylene diisocyanate and water, the isocyanurate of hexamethylene diisocyanate or the adduct of isophorone diisocyanate and trimethylolpropane. The average functionality can be reduced, if desired, by the addition of monoisocyanates. Examples of such chain-terminating monoisocyanates are phenyl isocyanate, cyclohexyl isocyanate and stearyl isocyanate.

The component (c) serves for the introduction of polymerizable double bonds into the polyurethane resin molecules. It is preferred to use as the component (c) a compound which contains at least two groups reactive toward NCO groups and a polymerizable double bond. Compounds which contain two groups reactive toward NCO groups in addition to a polymerizable double bond are used particularly preferably as the component (c). Examples of groups reactive toward NCO groups are —OH, —SH, >NH and —NH$_2$ groups, —OH, >NH and —NH$_2$ groups being preferred. Examples of compounds which can be used as the component (c) are: hydroxy (meth) acrylates, in particular hydroxyalkyl (meth)acrylates such as hydroxyethyl, hydroxypropyl, hydroxybutyl or hydroxyhexyl (meth)acrylate and 2,3-dihydroxypropyl (meth) acrylate, 2,3-dihydroxypropyl monoallyl ether, allyl 2,3-dihydroxypropanoate, glycerol mono(meth)acrylate, glycerol monoallyl ether, pentaerythritol mono(meth)acrylate, pentaerythritol di(meth)acrylate, pentaerythritol monoallyl ether, pentaerythritol diallyl ether, trimethylolpropane monoallyl ether, trimethylpropane [sic] mono(meth)acrylate and trimethylolpropane diallyl ether. Trimethylolpropane monoallyl ether, glycerol mono(meth)acrylate, pentaerythritol di(meth)acrylate, pentaerythritol diallyl ether, glycerol monoallyl ether and trimethylolpropane mono(meth)acrylate are preferably used as the component (c). Trimethylolpropane monoallyl ether, glycerol monoallyl ether and allyl 2,3-dihydroxypropanoate are used particularly preferably as the component (c). It is preferred to incorporate the components (c) which contain at least two groups reactive toward NCO groups into the polyurethane molecules as part of a chain (not terminal).

The introduction of groups capable of forming anions into the polyurethane molecules is carried out by incorporating in the polyurethane molecules compounds (d) which contain in the molecule at least one group reactive toward isocyanate groups and a group capable of forming anions.

The Mount of the component (d) to be used can be calculated from the targeted acid value.

Compounds which contain in the molecule two groups reactive toward isocyanate groups are preferably used as the component (d). Suitable groups reactive toward isocyanate groups are in particular hydroxyl groups as well as primary and/or secondary amino groups. Suitable groups capable of forming anions are carboxyl, sulfonic acid and/or phosphonic acid groups, carboxyl groups being preferred. Alkanoic acids having two substituents on the e carbon atom may be used, for example, as the component (d). The substituent may be a hydroxyl group, an alkyl group or, preferably, an alkylol group. These alkanoic acids have at least one, generally 1 to 3 carboxyl groups in the molecule. They have two to about 25, preferably 3 to 10 carbon atoms. Examples of the component (b) are dihydroxypropionic acid, dihydroxysuccinic acid and dihydroxybenzoic acid. A group of alkanoic acids which is particularly preferred are the α,α-dimethylolalkanoic acids of the general formula R$^4$—C(CH$_2$OH)$_2$COOH, in which R$^4$ is a hydrogen atom or an alkyl group having up to about 20 carbon atoms.

Examples of such compounds are 2,2-dimethylolacetic acid, 2,2-dimethylolpropionic acid, 2,2-dimethylolbutyric acid and 2,2-dimethylolpentanoic acid. 2,2-Dimethylolpropionic acid is the preferred dihydroxyalkanoic acid. Examples of compounds containing amino groups are α,δ-diaminovaleric acid, 3,4-diaminobenzoic acid, 2,4-diaminotoluenesulfonic acid and 2,4-diaminodiphenyl ether sulfonic acid.

Poly(oxyalkylene) groups can be introduced into the polyurethane molecules as non-ionic stabilizing groups with the aid of the component (e). Alkoxypoly(oxyalkylene) alcohols of the general formula R'O—(—CH$_2$—CHR'—O—)$_n$H in which R' is an alkyl radical of 1 to 6 carbon atoms, R' is a hydrogen atom or an alkyl radical of 1 to 6 carbon atoms and n is a number between 20 and 75 may be used, for example, as the component (e).

The use of the component (f) leads to a molecular weight increase of the polyurethane resins. Polyols having up to 36 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di(trimethylolpropane) ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A and mixtures thereof may be used, for example, as the component (f). The polyols are generally used in amounts of up to 30% by weight, preferably of 2 to 20% by weight, based on the amount of the component (a) and (f) used.

Diamines and/or polyamines with primary and/or secondary amino groups may also be used as the component (f). Polyamines are essentially alkylene polyamines having 1 to 40 carbon atoms, preferably about 2 to 15 carbon atoms. They may contain substituents which have no hydrogen atoms reactive with isocyanate groups. Examples are polyamines with linear or branched aliphatic, cycloaliphatic or aromatic structure and at least two primary amino groups. Suitable diamines are hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-diaminodicyclohexylmethane and aminoethylethanolamine. Preferred diamines are hydrazine, alkyldiamines or cycloalkyldiamines such as propylenediamine and 1-amino-3-aminomethyl-3,5,5-trimethylcyclohexane. Polyamines which contain more than two amino groups in the molecule may also be used as the component (f). However, in such cases care must be taken—for example by using monoamines at the same time—that no crosslinked polyurethane resins are obtained. Such usable polyamines are diethylenetriamine, triethylenetetramine, dipropylenediamine and dibutylenetriamine. A suitable example of a monoamine is ethylhexylamine.

The binders used according to the invention are prepared by preparing a solution of the polyurethane resin (B) in an organic solvent or a mixture of organic solvents and polymerizing in this solution ethylenically unsaturated monomers or a mixture of ethylenically unsaturated monomers in a free-radical polymerization and converting the resultant reaction product to an aqueous dispersion. It is preferred to use water-miscible organic solvents. Examples of usable solvents are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether and 3-methyl-3-methoxybutanol or mixtures of these solvents.

Ketones, such as acetone, methyl ethyl ketone, diethyl ketone and methyl isobutyl ketone, are preferred.

The free-radical polymerization is carried out at temperatures of 80° to 160° C., preferably of 100° to 160° C., in the above organic solvents or solvent mixtures.

Examples of usable polymerization initiators are free radical-forming initiators, such as benzoyl peroxide, azobisisobutyronitrile and t-butyl perbenzoate.

In the polymerization grafting reactions also occur between the polyurethane resin (B) and the component (A). The components (A) and (B) are used in a weight ratio of 1:10 to 10:1, preferably 1:2 to 2:1, particularly preferably 1:1.

Practically any free-radically polymerizable monomer may be used as the ethylenically unsaturated monomer, the usual copolymerization constraints which are defined by the Q and e scheme according to Alfrey and Price or by the copolymerization parameters being, however, valid (cf. for example Brandrup and Immergut, Polymer Handbook, 2nd ed. John Wiley+Sons, New York (1975)). The following can be used as ethylenically unsaturated monomers:

(i) aliphatic or cycloaliphatic esters of acrylic acid or methacrylic acid or a mixture of such esters and (ii) ethylenically unsaturated monomers containing at least one hydroxyl group in the molecule or a mixture of such monomers and (iii) ethylenically unsaturated monomers containing at least one carboxyl group in the molecule or a mixture of such monomers and (iv) other ethylenically unsaturated monomers which are different from (i), (ii) and (iii) or a mixture of such monomers and (v) polyunsaturated monomers, in particular ethylenically polyunsaturated monomers.

The above monomers are preferably used as mixtures, the component (i) being used in an amount of 0 to 100, preferably of 60 to 90% by weight, the component (ii) in an amount of 0 to 20, preferably of 3 to 12% by weight, the component (iii) in an amount of 0 to 30, preferably of 5 to 15% by weight, the component (iv) in an amount of 0 to 30, preferably of 0 to 10% by weight and the component (v) in an amount of 0 to 5, preferably of 0% by weight, the sum of the proportions by weight of (i), (ii), (iii), (iv) and (v) always being 100% by weight.

The following can be used, for example, as the component (i): cyclohexyl acrylate, cyclohexyl methacrylate, alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate or mixtures of these monomers.

The following may be used, for example, as the component (ii): hydroxyalkyl acrylates, hydroxyalkyl methacrylates or hydroxyalkyl esters of another α,β-ethylenically unsaturated carboxylic acid. These esters may be derived from an alkylene glycol which is esterified with the acid, or they can be obtained by reacting the acid with an alkylene oxide. Hydroxyalkyl acrylates and hydroxyalkyl methacrylates in which the hydroxyalkyl group contains up to 4 carbon atoms, or mixtures of these hydroxyalkyl esters, are preferably used as the component (ii). Examples of such hydroxyalkyl esters are 2-hydroxyethyl acrylate, 2-hydroxypropyl acrylate, 2-hydroxypropyl methacrylate, 3-hydroxypropyl acrylate, 3-hydroxypropyl methacrylate, 2-hydroxyethyl methacrylate, 3-hydroxybutyl acrylate or 4-hydroxybutyl (meth)acrylate. Corresponding esters of other unsaturated acids, for example ethacrylic acid, crotonic acid and similar acids having up to about 6 carbon atoms per molecule, may also be used.

Acrylic acid and/or methacrylic acid are preferably used as the component (iii). However, other ethylenically unsaturated acids having up to 6 carbon atoms in the molecule may also be used. Examples of such acids are ethacrylic acid, crotonic acid, maleic acid, fumaric acid and itaconic acid.

The following may be used, for example, as the component (iv): vinylaromatic hydrocarbons such as styrene, α-alkylstyrene and vinyltoluene, acrylamide and methacrylamide, acrylonitrile and methacrylonitrile or mixtures of these monomers.

Compounds which contain at least two free-radically polymerizable double bonds in the molecule may be used as the component (v). Examples of these are: divinylbenzene, p-methyldivinylbenzene, o-nonyldivinylbenzene, ethanediol di(meth)acrylate, 1,4-butanediol di(meth) acrylate, 1,6-hexanediol di(meth)acrylate, trimethylolpropane tri(meth)acrylate, pentaerythritol di(meth)acrylate, allyl methacrylate, diallyl phthalate, butanediol divinyl ether, divinylethyleneurea, divinylpropyleneurea, diallyl maleate etc.

The use of difunctional unsaturated monomers such as butanediol diacrylate or hexanediol diacrylate is preferred. When glycidyl methacrylate and methacrylic acid are used, the corresponding glycerol dimethacrylate forms automatically in the polymerization. The type and amount of polyunsaturated monomers must be carefully adjusted to suit the reaction conditions (catalysts, reaction temperature, solvents) in order to avoid gelling. The purpose of the amount of polyunsaturated monomers added is to raise the average molecular mass without gel formation. It is preferred, however, not to use any polyunsaturated monomers.

The polymers prepared from (A) and (B) and used according to the invention must contain groups capable of forming anions which are neutralized before or during the transfer of the polymers from the organic solvent or solvent mixture into water and which allow the formation of stable aqueous dispersions. In addition to the groups capable of forming anions, the polymers under discussion may also contain non-ionic stabilizing groups such as poly(oxyalkylene) groups, in particular poly(oxyethylene) and/or poly(oxypropylene) and/or poly(oxyethylene) (oxypropylene) groups.

The amount of groups capable of forming anions contained in the polymers prepared from (A) and (B) used according to the invention should be such that the polymers have an acid value of 5 to 200, preferably 10 to 40, particularly preferably 15 to 30. The introduction of groups capable of forming anions into the polymers under discussion can be carried out, for example, via the components (d) and (iii). The groups capable of forming anions may be contained exclusively in the component (A) or exclusively in the component (B) or both in the component (A) and the component (B). It is preferred that 50 to 100, preferably 70 to 100, particularly preferably 100% of the groups capable of forming anions are contained in the component (A).

The introduction of poly(oxyalkylene) groups into the polymers according to the invention may be carried out via the component (e) or via ethylenically unsaturated monomers which contain at least one poly(oxyalkylene) group (for example poly(oxyethylene) (meth)acrylates). The polymers according to the invention should not contain excessive amounts of poly(oxyalkylene) groups, since otherwise the humidity resistance of the paint films can be reduced. The content of poly(oxyalkylene) groups may lie in the proximity of 1 to 10% by weight, preferably 1 to 5% by weight (based on the weight of the polymers prepared from (A) and (B)).

The polymers prepared from (A) and (B) used according to the invention should preferably not contain any non-ionic stabilizing groups.

The polymers prepared from (A) and (B) should preferably have a hydroxyl value of 0 to 100, particularly preferably of 20 to 80. The number average molecular weight of the polymers should preferably be 2,000 to 20,000, particularly preferably 5,000 to 12,000.

The polymers which are particularly preferred are those polymers prepared from (A) and (B) which have a polymolecularity index Q of 5 to 90, preferably of 10 to 0. The polymolecularity index is the quotient $M_w:M_n$, where $M_w$ is the weight average molecular weight and $M_n$ is the number average molecular weight.

The polymolecularity index can be influenced, for example by a targeted use of regulators and by the type of the solvents used. In addition Q is influenced by the content of polymerizable double bonds contained in the component (B). The greater is Q, the smaller is the amount of regulator used and the amount of solvents used, which can function as regulator. The lower the content of polymerizable double bonds in the component (B), the greater is Q.

Q can be determined by gel permeation chromatography using a polystyrene standard.

At the end of the polymerization of the component (A) the resultant polymer is at least partially neutralized and dispersed in water.

Both organic bases and inorganic bases, such as ammonia and hydrazine, may be used for the neutralization. Primary, secondary and tertiary amines, for example ethylamine, propylamine, dimethylamine, dibutylamine, cyclohexylamine, benzylamine, morpholine, piperidine and triethanolamine, are preferably used. Tertiary amines, in particular dimethylethanolamine, triethylamine, tripropylamine and tributylamine, are used particularly preferably as the neutralization agent.

If desired, some or preferably all of the organic solvents can be distilled off from the resultant aqueous binder dispersions. The binder dispersions contain polymer particles whose average particle size is between 10 and 500 nm, preferably between 60 to [sic] 150 nm (method of measurement: laser light scatter; measuring instrument: Malvern Autosizer 2 C).

Aqueous paints, in particular aqueous solid-color and aqueous metallic basecoats can be prepared from the binder dispersions under discussion by generally well known methods. The basecoats may also be used for refinishing and can be recoated with both aqueous and conventional clearcoats and powder paints.

In addition to the binders according to the invention, the basecoats may contain further compatible water-thinnable synthetic resins, for example amino resins, polyurethane resins, polyacrylate resins, polyesters and polyethers.

The basecoats contain preferably 5 to 90, particularly preferably 40 to 70% by weight of the binder according to the invention, the percentages by weight being based on the total solids content of the basecoats.

The basecoats according to the invention may contain as pigments chromophoric inorganic pigments, for example titanium dioxide, iron oxide, carbon black etc., chromophoric organic pigments and conventional metallic pigments (for example commercial aluminum bronzes, stainless steel bronzes etc.) and non-metallic effect pigments (for example pearlescent or interference pigments). The degree of pigmentation is in the conventional range. It is a particular advantage of the binders used according to the invention that they may also be used as grinding resin and furnish highly stable pigment pastes.

The basecoats according to the invention may further contain crosslinked polymeric microparticles, such as those disclosed, for example, in EP-A-38,127, and/or customary inorganic or organic additives. Examples used as thickener are water-soluble cellulose ethers, such as hydroxyethylcellulose, methylcellulose or carboxymethylcellulose as well as synthetic polymers containing ionic and/or associatively acting groups, such as polyvinyl alcohol, poly(meth)acrylamide, poly(meth)acrylic acid, polyvinylpyrrolidone, styrene-maleic anhydride or ethylene-maleic anhydride copolymers and their derivatives as well as hydrophobically modified ethoxylated urethanes or polyacrylates and polyacrylate copolymers containing carboxyl groups, having an acid value of 60 to 780, preferably 200 to 500.

The basecoats according to the invention generally have a solids content of about 15 to 50% by weight. The solids content varies according to the intended application of the coating compositions. For metallic paints it is, for example, preferably 17 to 25% by weight. For solid-color paints it is higher, for example 30 to 45% by weight. The paints according to the invention may additionally contain conventional organic solvents. The content of these should be kept as low as possible. For example, it is below 15% by weight.

The pH of the basecoats according to the invention is generally adjusted to between 6.5 and 9.0. The pH may be adjusted using customary amines, for example ammonia, triethylamine, dimethylaminoethanol and N-methylmorpholine.

The basecoats according to the invention may be recoated with aqueous conventional clearcoats or powder clearcoats.

The object identified at the outset is achieved by the provision of the basecoats according to the invention.

High-quality finishes may be obtained with the basecoats according to the invention even without recoating with a transparent topcoat. The one-coat finishes obtained in this way are particularly distinguished by high gloss, good mechanical-technological properties and high humidity resistance.

The aqueous paints according to the invention may be applied to any substrate, for example metal, wood, plastics or paper. The application may be performed directly, as is customary in the automotive industry, after an electrodeposition primer and a body filler have been applied.

The paints according to the invention may be applied by spraying, blade-coating, dipping, rolling and preferably by electrostatic and compressed-air spraying.

The invention is explained in greater detail in the examples below. All percentages and parts are by weight, unless expressly stated otherwise.

1. Preparation of Binder Dispersions According to the Invention 1.1 Binder Dispersion A 275 g of isophorone diisocyanate are added to a mixture of 336 g of a polyester having a number average molecular weight of 630 based on adipic acid, hexanediol and neopentyl glycol (molar ratio 1:0.5:1), 31 g of neopentyl glycol, 27.8 g of trimethylolpropane monoallyl ether, 0.45 g of dibutyltin dilaurate and 279.7 g of methyl ethyl ketone, contained in a 5 l reaction vessel fitted with a stirrer, a reflux condenser and two feed vessels. The reaction mixture is then heated to a temperature of 80° C. in an atmosphere of nitrogen. When the NCO content reaches 2.2%, 66.7 g of trimethylolpropane are added to the reaction mixture and the reaction is allowed to continue until no more isocyanate groups can be detected. 248.9 g of methyl ethyl ketone are then added.

A mixture of 312.5 g of n-butyl acrylate, 312.5 g of methyl methacrylate, 74.7 g of hydroxypropyl methacrylate and 58.4 g of acrylic acid is then added to the reaction mixture over 3 hours at a temperature of 82° C. At the same time 175 g of a 13 percent solution of 2,2'-azobis (methylbutyronitrile) in methyl ethyl ketone are metered in over 3.5 hours.

After a further 2.5 hours at 82° C. 56.9 g of dimethylethanolamine and 2242 g of deionized water are added.

After removal of the methyl ethyl ketone in vacuo a 40 percent aqueous dispersion which is free from coagulate and has a pH of 8.1 and an average particle diameter of 100 mm is obtained.

1.2 Binder Dispersion B 289.5 g of isophorone diisocyanate are added to a mixture of 353.5 g of a polyester having a number average molecular weight of 630 based on adipic acid, maleic anhydride, hexanediol and ethylbutyl-1,3-propanediol (molar ratio 0.9:0.1:0.5:1), 39.4 g of neopentyl glycol, 18.0 g of trimethylolpropane monoallyl ether, 0.45 g of dibutyltin dilaurate and 330 g of methyl isobutyl ketone, contained in a 5 l reaction vessel fitted with a stirrer, a reflux condenser and two feed vessels. The reaction mixture is then heated to a temperature of 105° C. in an atmosphere of nitrogen. When the NCO content reaches 2.2%, 69.6 g of trimethylolpropane are added to the reaction mixture. When the residual NCO content is less than 0.05%, 150.2 g of methyl isobutyl ketone are added.

A mixture of 417.4 g of n-butyl acrylate, 217.4 g of methyl methacrylate, 75.9 g of hydroxypropyl methacrylate and 59.4 g of acrylic acid are then added to the reaction mixture over 3 hours at a temperature of 105° C. At the same time 179.9 g of an 11.7 percent solution of tertiary-butyl perethylhexanoate in methyl isobutyl ketone are metered in over 3.5 hours.

After a further 2.5 hours at 105° C. 51.3 g of dimethylethanolamine and 2310 g of deionized water are added.

After removal of the methyl isobutyl ketone in vacuo a 43 percent aqueous dispersion which is free from coagulate and has a pH of 7.9 and an average particle diameter of 100 run is obtained.

1.3 Binder Dispersion C 285.4 g of isophorone diisocyanate are added to a mixture of 348.8 g of a polyester having a number average molecular weight of 630 based on adipic acid, hexanediol and ethylbutyl-1,3-propanediol (molar ratio 1:0.5:1), 41.4 g of dimethylolpropionic acid, 28.9 g of trimethylolpropane monallyl [sic] ether and 330.9 g of methyl ethyl ketone, contained in a 6 l reaction vessel fitted with a stirrer, a reflux condenser and two feed vessels.

The reaction mixture is then heated to a temperature of 80° C. in an atmosphere of nitrogen. When the NCO content reaches 2.1%, 67.4 g of trimethylolpropane are added to the reaction mixture.

A mixture of 320.6 g of n-butyl acrylate, 362 g of methyl methacrylate, 76.7 g of hydroxypropyl methacrylate and 27.3 g of acrylic acid is then added over 3 hours at a reaction temperature of 82° C. At the same time 186.4 g of a 12 percent solution of 2,2'-azobis-(methylbutyronitrile) in methyl ethyl ketone is metered in over 3.5 hours.

After a further 2.5 hours at 105° C., 50.9 g of dimethylethanolamine and 3480.2 g of deionized water are added.

After removal of the methyl isobutyl ketone [sic] in vacuo, a 30 percent aqueous dispersion which is free from coagulate and has a pH of 7.9 and an average particle diameter of 70 nm is obtained.

2. Preparation of Basecoats According to the Invention

Basecoat 1

200 g of binder dispersion A are predispersed with 59 g of water, 40 g of butyl diglycol and 256 g of a white pigment (titanium oxide) in a dissolver for 15 min. at 21 m/sec. and is then ground for 30 min. in a bead mill at 50° C. max.

A further 200 g of the above binder dispersion A, 55 g of a commercial melamine resin and 66 g of demineralized water are added with stirring to 619 g of the above mill base.

Basecoats 2 and 3

A procedure similar to that used for the preparation of basecoat 1 is used. Further details are listed in Table 1.

TABLE 1

|  | Basecoat 2 | Basecoat 3 |
| --- | --- | --- |
| Binder dispersion B | 300.00 g | — |
| Binder dispersion C | — | 560.0 g |
| Water-soluble polyester 1) | 80.0 g | — |
| Surfactant 2) | 4.0 g | 4.0 g |
| White pigment | — | 256.0 g |
| Carbon black | 30.0 g | — |
| Butyl diglycol | 40.0 g | 50.0 g |
| Melamine-formaldehyde resin 3) | 60.0 g | 58.0 g |
| Demineralized water | 486.0 g | 72.0 g |

1) Polyester having a number average molecular weight of 1900 and an acid value of 30, based on neopentyl glycol, isophthalic acid, trimellitic anhydride (molar ratio 2:1:0.75) (60% solution in butanol/water 1:1).
2) 50% solution of surfactant S (commercial product from Air Products) in butyl glycol.
3) Luwipal 072, commercial product from BASF AG.

1) Polyester having a number average molecular weight of 1900 and an acid value of 30, based on neopentyl glycol, isophthalic acid, trimellitic anhydride (molar ratio 2:1:0.75) (60% solution in butanol/water 1:1).
2) 50% solution of surfactant S (commercial product from Air Products) in butyl glycol.
3) Luwipal 072, commercial product from BASF AG.

3. Production of Basecoat/Clearcoat Finishes Using the Basecoats According to the Invention The basecoats according to the invention are applied by electrostatic spraying to zinc phosphated automotive body panels coated with a commercial electro-deposition primer and a commercial body filler in such a way that paint films with dry film thicknesses (depending on shade) of 12 to 30 μm are obtained. After a brief flash-off period the coating is recoated with a commercial clearcoat and baked for 30 minutes at 130° C. A panel painted in this way is once more coated with the basecoat according to the invention, followed, after a brief flash-off period, by a commercial two-component refinish and dried for 30 minutes at 90° C. The dry film thicknesses of the clearcoats are about 40 μm. Finishes with good flow-out, high brilliance and very good mechanical properties are obtained.

After 240 hours' exposure to the constant humidity test according to SK DIN 50017 the coated panels show no changes on the surface of the paint. An adhesion test performed subsequently according to DIN 53 151 produces the value 0. A blasting test carried out with 1,000 g of beveled shot (4–5 mm diameter) performed subsequently in an Erichsen stone impacter 508 according to VDA only resulted in minute chipping.

We claim:

1. A process for the production of a multicoat finish on a substrate surface, in which
   (1) a pigmented aqueous basecoat is applied to the substrate surface,
   (2) a polymer film is formed from the composition applied in stage (1),
   (3) a transparent topcoat is applied to the basecoat obtained in this way and subsequently
   (4) the basecoat is baked together with the topcoat, wherein the basecoat comprises as binder a polymer which can be obtained by polymerizing in an organic solvent or in a mixture of organic solvents
   (A) ethylenically unsaturated monomers or a mixture of ethylenically unsaturated monomers in the presence of
   (B) a polyurethane resin which has a number average molecular weight of 200 to 30,000, preferably of 1,000 to 5,000, and which contains on a statistical average 0.05 to 1.1, preferably 0.2 to 0.9, particularly preferably 0.3 to 0.7 polymerizable double bonds per molecule,
   and converting the reaction product obtained in this way to an anionically stabilized aqueous dispersion.

2. The process as claimed in claim 1 wherein the polymer prepared from (A) and (B) has an acid value of 5 to 200, preferably of 10 to 40, particularly preferably of 15 to 30, a hydroxyl value of 0 to 100, preferably of 20 to 80, and a number average molecular weight of 2,000 to 20,000, preferably of 5,000 to 12,000.

3. The process as claimed in claim 1 wherein the polymer prepared from (A) and (B) has a molecular wight distribution $Q=M_w:M_n$ of 5 to 90, preferably of 10 to 30.

4. The process as claimed in claim 1 wherein the polymer can be obtained by using the components (A) and (B) in a weight ration of 1:10 to 10:1, preferably 1:2 to 2:1, particularly preferably 1:1.

5. The process as claimed in claim 1 wherein the polyurethane resin which contains polymerizable double bonds, introduced into the molecules of the polyurethane resin by incorporation of compounds which contain, in addition to a polymerizable double bond, at least two groups reactive toward NCO groups, is used as the component (B).

6. The process as claimed in claim 1 wherein the polyurethane resin which contains allyl ether groups as polymerizable double bonds is used as the component (B).

7. The process as claimed in claim 1 wherein the polyurethane resin which has trimethylolpropane monoallyl ether incorporated is used as the component (B).

8. The process as claimed in claim 1 wherein the polymer can be obtained by using as the component (B) a polyurethane resin which has an acid value of 0 to 2.0.

9. An aqueous paint which contains as binder a polymer which can be obtained by polymerizing in an organic solvent or in a mixture of organic solvents
   (A) ethylenically unsaturated monomers or a mixture of ethylenically unsaturated monomers in the presence of
   (B) a polyurethane resin which has a number average molecular weight of 200 to 30,000, preferably of 1,000 to 5,000, and which contains on statistical average 0.05 to 1.1, preferably 0.2 to 0.9, particularly preferably 0.3 to 0.7 polymerizable double bonds per molecule
   and converting the reaction product obtained in this way to an anionically stabilized aqueous dispersion.

10. The paint as claimed in claim 9, wherein the polymer prepared from (A) and (B) has an acid value of 5 to 200, preferably of 10 to 40, particularly preferably of 15 to 30, a hydroxyl value of 0 to 100, preferably of 20 to 80, and a number average molecular weight of 2,000 to 20,000, preferably of 5,000 to 12,000.

11. The paint as claimed in claim 9 wherein the polymer prepared from (A) and (B) has a molecular weight distribution $Q=M_w:M_n$ of 5 to 90, preferably of 10 to 30.

12. The paint as claimed in claim 9 wherein the polymer can be obtained by using the components (A) and (B) in a weight ratio of 1:10 to 10:1, preferably 1:2 to 2:1, particularly preferably 1:1.

13. The paint as claimed in claim 9, wherein a polyurethane resin which contains polymerizable double bonds, introduced into the molecules of the polyurethane resin by incorporation of compounds which contains, in addition to a polymerizable double bond, at least two groups reactive toward NCO groups, is used as the component (B).

14. The paint as claimed in claim 9 wherein the polyurethane resin which contains allyl ether groups as polymerizable double bonds is used as the component (B).

15. The paint as claimed in claim 9 wherein the polyurethane resin which has trimethylolpropane monoallyl ether incorporated is used as the component (B).

16. The paint as claimed in claim 9 wherein the polymer can be obtained by using as the component (B) a polyurethane resin which has an acid value of 0 to 2.0.

* * * * *